United States Patent
Chesnutt et al.

(12) 
(10) Patent No.: US 6,356,410 B1
(45) Date of Patent: Mar. 12, 2002

(54) METHOD AND STRUCTURE FOR DEFINING TRACK WIDTH ON A RECORDING HEAD

(75) Inventors: Robert Chesnutt, Arvada; Charles Partee, Boulder; Pierre Asselin, Westminster; John Biesecker; John Fleming, both of Boulder; Mike Jennison, Broomfield; Francis Campos; Steve Sanders, both of Louisville, all of CO (US)

(73) Assignee: Matsushita-Kotobuki Electronics Industries, Ltd., Saijo (JP)

( * ) Notice: Subject to any disclaimer, the term of this patent is extended or adjusted under 35 U.S.C. 154(b) by 0 days.

(21) Appl. No.: 09/592,593

(22) Filed: Jun. 12, 2000

Related U.S. Application Data

(62) Division of application No. 08/984,926, filed on Dec. 4, 1997, now Pat. No. 6,105,238.

(51) Int. Cl.[7] .............................................. G11B 5/147
(52) U.S. Cl. ........................................................ 360/126
(58) Field of Search ................................. 360/125, 126

(56) References Cited

U.S. PATENT DOCUMENTS

| | | | | |
|---|---|---|---|---|
| 5,285,340 A | * | 2/1994 | Ju et al. | .................. 360/119 |
| 5,452,164 A | * | 9/1995 | Cole et al. | .................. 360/113 |
| 5,649,351 A | | 7/1997 | Cole | |
| 5,668,689 A | | 9/1997 | Schultz et al. | |
| 5,802,700 A | | 9/1998 | Chen | |
| 5,805,391 A | | 9/1998 | Chang et al. | |
| 5,831,801 A | | 11/1998 | Shouji et al. | |
| 6,018,862 A | * | 2/2000 | Stageberg et al. | ........ 29/603.14 |

\* cited by examiner

Primary Examiner—George J. Letscher
(74) Attorney, Agent, or Firm—William J. Kubida; Kent A. Lembke; Hogan & Hartson LLP

(57) ABSTRACT

A head structure for writing data on a magnetic media including a first pole having an upper surface and a write gap covering a portion of the upper surface. An upper pole tip formed on the write gap having a first width. A second pole having a second width greater than the first width and coupling to an upper surface of the upper pole tip. A conductive coil magnetically coupled to the first pole and the second pole to induce magnetic flux within the first and second pole in response to a current flowing in the coil.

12 Claims, 5 Drawing Sheets

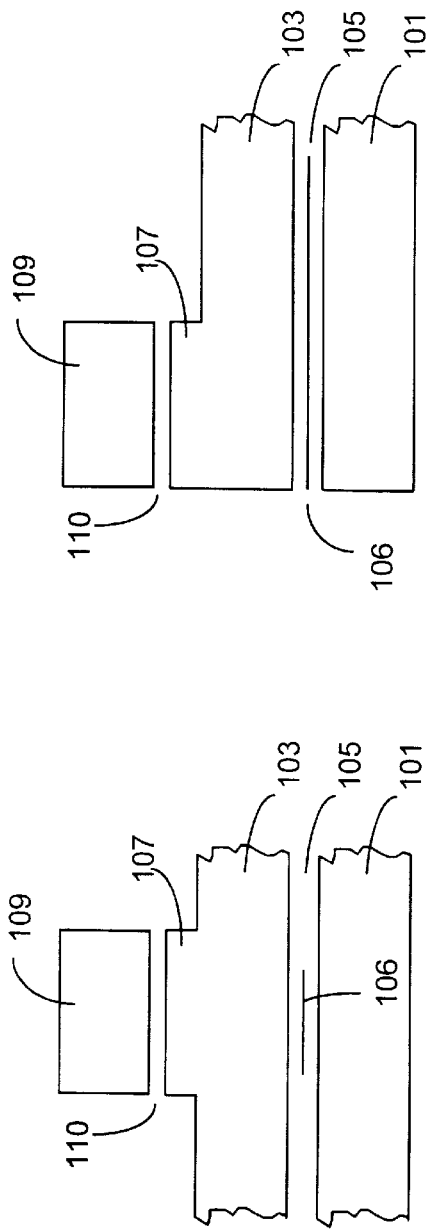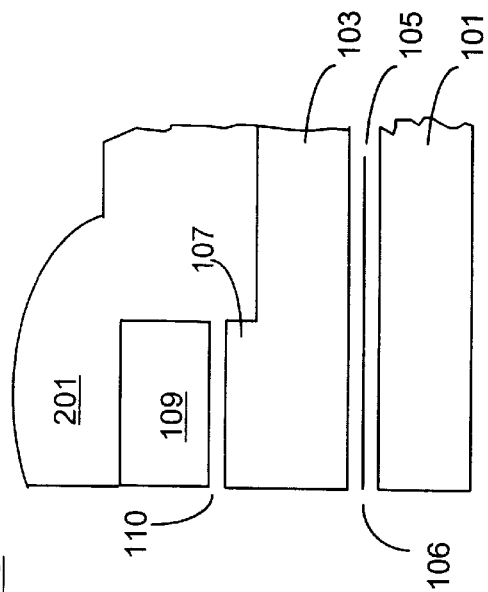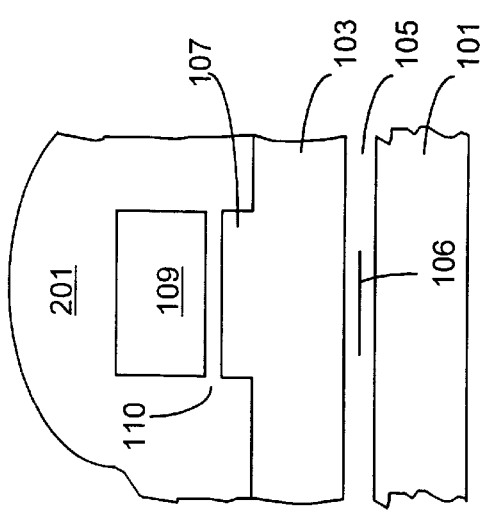

METHOD AND STRUCTURE FOR DEFINING TRACK WIDTH ON A RECORDING HEAD

FIELD OF THE INVENTION

The present application is a divisional application of U.S. patent application Ser. No. 08/984,926, filed Dec. 4, 1997, and issued Aug. 22, 2000 as U.S. Pat. No. 6,105,238.

BACKGROUND OF THE INVENTION

Relevant Background

The desktop personal computer market continues to demand higher capacity and faster performance from hard disk and tape drives. With applications such as file downloading, increased file sizes, advanced operating systems, and multimedia applications, demand for hard disk drive capacity, for example, is doubling every year. Technologies for storing and retrieving data from magnetic media must also be cost effective. Because lower cost per megabyte (MB) is also desired, the prior practice of simply adding more disks and "heads" (i.e., structure in which read and write elements are provided) to a hard drive is less and less effective. Disk and tape drive suppliers continue to increase areal densities, or the number of data bits per square inch, to meet the increasing demand for storage at competitive pricing. Read and write head design are key technologies needed to achieve these capacity increases.

The write element that writes data on the disk is typically made up of two poles that are separated by a write gap, and which generate a magnetic field when they are excited by a coil magnetically coupled to the poles. When the write element is in proximity to the disk, a magnetic field generated by the poles sets the magnetic orientation in given locations on the disk. In this manner, data is written on the disk.

The read element that reads data from the disk is sandwiched between two shields. During a read operation the read element flies in proximity to the disk so that the read element senses the magnetic orientation of the given disk locations. To enable the read element to focus on a small disk location during reading at (i.e. the read element must not be affected by the magnetic orientation of adjoining disk locations), it is desirable to shield the read element. The two relatively large shields filter out the magnetic effects of adjoining disk locations, so that a specific disk location can be focused upon for reading.

Hard disk drives with lower areal densities typically use inductive read and write elements. Inductive heads offer low cost and mature processing technology suitable for high volume production. To increase the signal strength from an inductive head, designers have increased the number of turns in the read head as the read signal is directly proportional to the number of turns. Some inductive heads use fifty or more turns in the read/write head. However, increasing the number of turns increases the head's inductance. There is a limit to the amount of inductance a head can tolerate to effectively perform data write operations. Since thin-film inductive heads use the same inductive element for both reading and writing, the head cannot be optimized for either operation. Moreover, the increased inductance decreases the frequency at which data can be written to and read from the magnetic media.

Magnetoresistive (MR) head technology is used to provide higher areal density than possible with inductive heads in both disk and tape drives. MR head structures include an MR element as a magnetic field sensor. A coil is formed above the read head and magnetically coupled to the magnetic yoke that defines the poles of the write element. Although the coil and yoke are magnetically coupled, they are separated by an insulating material to prevent current flow between the coils and the yoke. To provide an area efficient structure, it is desirable to vertically stack the coils in two or more layers.

An MR head generally combines the read and write elements of the head into an integrated unit. It does so by eliminating one of the poles of the write element and substituting in its place one of the shields of the read element. In doing so an integrated pole/shield element is created.

Using an MR structure as a read element provides high signal output and low noise compared to inductive heads. This higher signal output allows the write element to write data in a much narrower track while still being reliably detected by the MR read element. Separate read and write heads allow each head to be optimized for one particular function (i.e., reading or writing data). With an MR head, the number of wire turns in the write element can be greatly reduced, resulting in a low inductance head enabling high frequency write operations.

The track width of an MR head is largely determined by the size of the area of the disk that is affected by the write head. Where the pole/shield structure is physically large, the pole/shield will tend to undesirably affect a larger part of the disk during a write operation, which is a phenomenon referred to as "fringing". Fringing has an adverse effect on the efficient storage of data on the disk given that it is usually desirable to pack data on the disk as densely as possible, thereby increasing the storage capacity of the disk.

The track width can be decreased by making the poles physically small at the write tip (i.e., the portion of the yoke that forms the poles), thereby concentrating the magnetic field into a smaller area. However, in conventional MR head processes, the yoke, including the write tip, are formed as an integrated structure over the coil structure. The coil structure is very thick, especially when vertically stacked coils are used. Hence, the write tip is typically patterned using thick photoresist (on the order using thick photoresist (on the order of 10–15 microns thick) making it difficult to define the small structures that are required to decrease track width. Critical dimension control is poor when patterning thick layers of photoresist resulting in unacceptable variation in the size of the patterned feature.

What is needed therefore, is an MR head that combines the advantages of a small write tip structure, but that can be manufactured with a high degree of process control.

SUMMARY OF THE INVENTION

Briefly stated, the present invention involves a head structure for writing data on a magnetic media including a first, bottom pole having an upper surface and a write gap covering a portion of the upper surface. A first upper pole tip formed on the write gap having a first width. A second upper pole having a second width greater than the first width and coupling to an upper surface of the upper pole tip. A conductive coil magnetically coupled to the first bottom pole, the first upper pole, and the second upper pole to induce magnetic flux within the first bottom, first upper, and second upper pole in response to a current flowing in the coil.

In another aspect, the present invention involves a method for making a magnetic head including the steps of forming a first pole piece comprising magnetic material and depositing a gap-forming layer comprising nonmagnetic material over the bottom pole piece. The gap-forming layer is covered with an upper pole tip forming layer comprising a magnetic material. The pole tip forming layer is patterned to define a pole tip having a first width and the gap-forming layer and the first, bottom pole is etched using the pole tip as a mask to form a write gap and to expose a portion of the first pole piece. A planarizing structure is formed on the exposed portion of the first pole piece, the planarizing structure having an upper surface substantially planar with the upper surface of the first pole tip. A conductive coil is formed on the planarizing structure and with a coil insulator. The coil insulator is patterned to define a contact with the upper pole tip. An upper pole comprising a magnetic material is formed covering the coil insulator and contacting the top surface of the pole tip though the contact.

BRIEF DESCRIPTION OF THE DRAWINGS

FIG. 7 and FIG. 8 show orthogonal views of the read/write head illustrated in FIG. 5 and FIG. 6 at a later stage in processing;

FIG. 9 and FIG. 10 show orthogonal views of the read/write head in accordance with the present invention at a still later stage in processing;

DETAILED DESCRIPTION OF THE PREFERRED EMBODIMENTS

Figure 1:
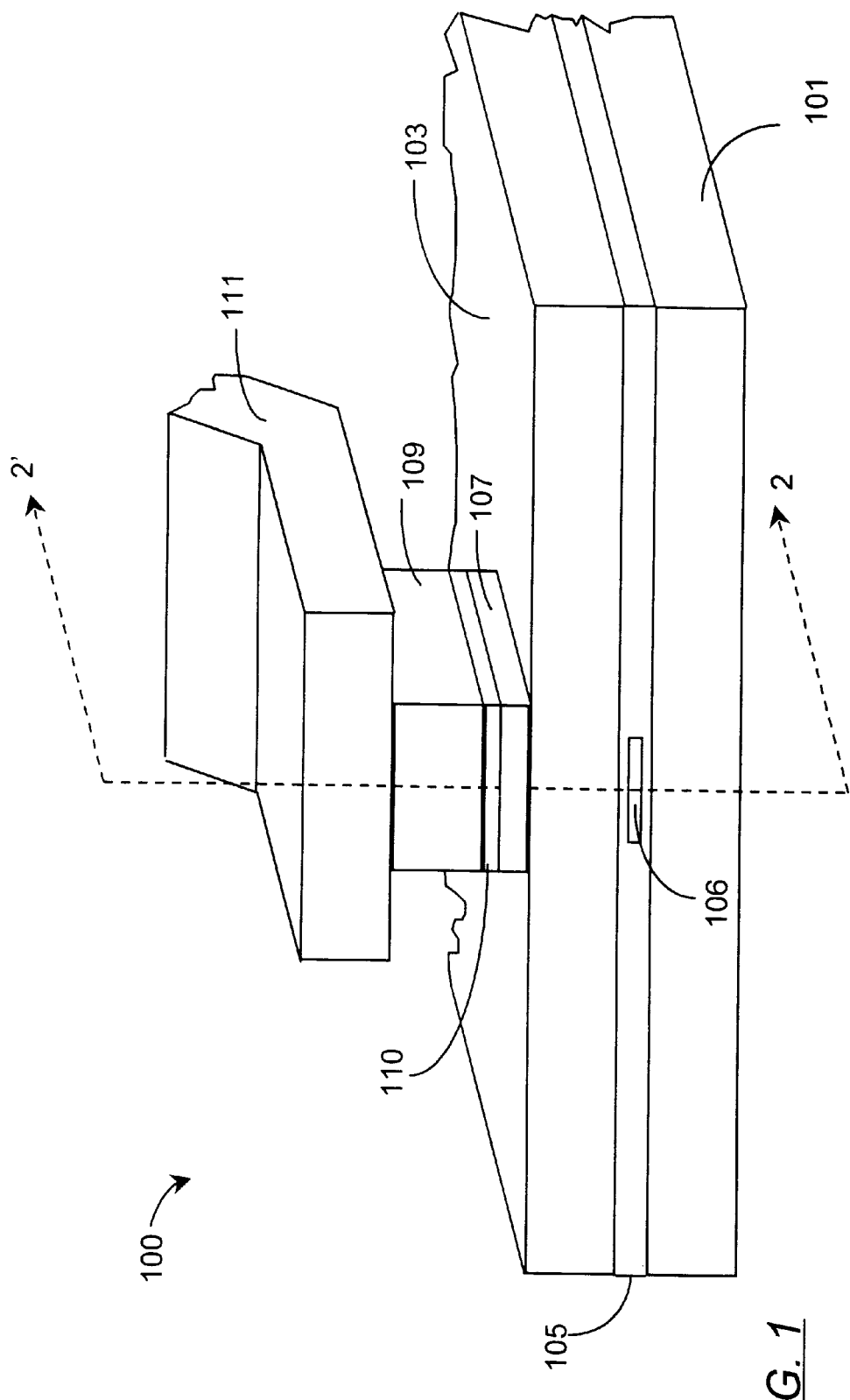
FIG. 1 shows a simplified perspective view of a MR read/write head in accordance with the present invention.

Magnetoresistive (MR), including giant magnetoresistive (GMR) read/write heads, such as read/write head 100 shown in FIG. 1, are typically mounted on a slider (not shown) that flies in proximity to a surface of a magnetic recording media (not shown) in a hard disk drive. The magnetic recording media is, for example, a metal, ceramic or plastic disk coated with a magnetic thin film. Read/write head 100 comprises a magnetic field sensor 106 to read data and a magnetic field generator to write data on the disk. The magnetic field generator typically includes two poles 107 and 109 that are separated by a "write gap" 110. A magnetic field is generated when poles 107 and 109 are excited by a current flowing in a coil formed by coil elements 207 and 209 shown in FIG. 2. When write gap 110 is in proximity to the magnetic media, a magnetic field generated by poles 107 and 109 creates selected magnetic orientations in selected locations on the magnetic media.

Magnetic field sensor 106 may comprise a MR element or GMR element positioned between two shield elements 101 and 103. Shield element 103 serves as both a shield for magnetic field sensor 106 and a pole 107 for the magnetic field generator and is commonly referred to herein as a shared shield/pole element. To aid understanding the present invention is described in terms of specific materials and specific processes. However, unless expressly stated otherwise, equivalent processes may be substituted for the specific examples disclosed herein. In this manner the present invention may be adapted for use with available processing technology and designs without departing from the scope and spirit of the present invention.

FIG. 3 through FIG. 14 shows cross section illustrating fabrication steps to form read/write head 100 in accordance with the present invention.

Figure 2:
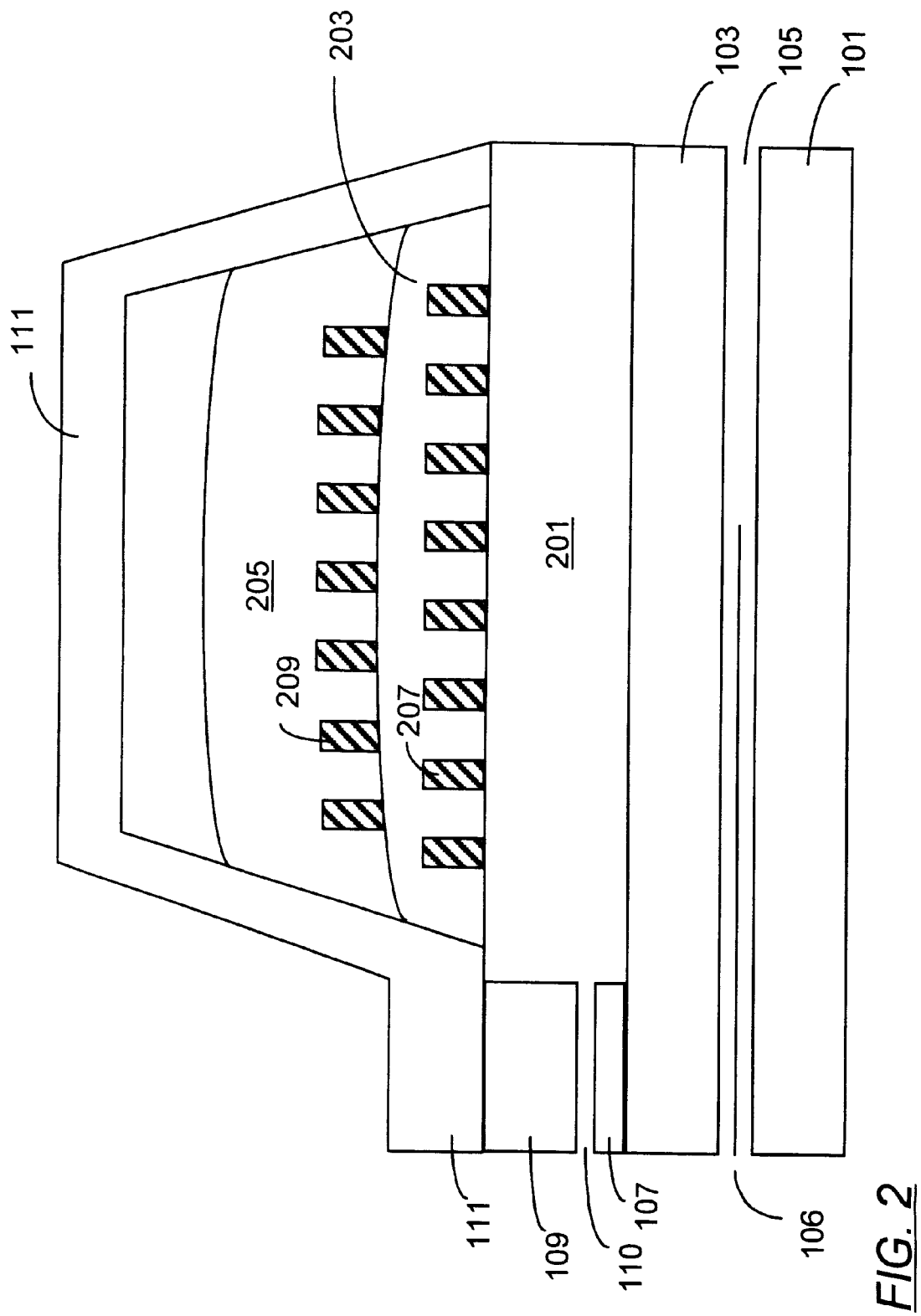
FIG. 2 shows an enlarged cross-section view of the read/write head shown in FIG. 1.

The read/write head 100 shown in FIG. 1 and FIG. 2 is formed on a substrate (not shown) that comprises, for example a ceramic base having an upper surface comprising approximately 8 microns of sputter deposited silicon oxide or aluminum oxide ($Al_2O_3$) or alumina to form the base layer. A specific example of suitable ceramic base material is alumina with titanium carbide. Suitable equivalents for the substrate include silicon, glass, and the like. The upper surface of the substrate is polished using mechanical and/or chemical-mechanical polishing to provide an ultrasmooth surface finish.

Shield 101 comprises, for example, a magnetic material such as nickel iron alloy (i.e., permalloy) that is plated to a thickness of two to three microns. The plating can be performed, for example, by electroplating using a conductive seed layer of approximately 1000 angstrom thickness formed by sputtering onto the substrate (not shown). The seed layer comprises nickel iron in the specific example and is patterned by conventional photolithography and etch techniques to define the shape of shield 101. After the electrodeposition of shield 101, the photoresist is stripped using available wet or dry photoresist removal techniques.

MR element 106 is separated from shield element 106 by a thin separation layer of non-magnetic material 105 such as sputter deposited alumina or other dielectric. Layer 105 is sometimes referred to as a "read gap" layer. Read gap layer 105 can be formed by blanket deposition of from twenty to two thousand angstroms of a non-magnetic high-resistivity metal or dielectric material.

MR element 106 comprises a magnetoresistive or giant magnetoresistive film and biasing layer of appropriate thickness. Suitable MR and GMR element designs are known and are described in, for example, U.S. Pat. No. 5,573,809 issued Nov. 12, 1996 and assigned to the assignee of the present application. MR element 106 is typically formed by blanket deposition by ion beam deposition, evaporation or sputtering of appropriate thin film layers of material and subsequent photolithography and patterning. Conductive electrodes (not shown) are provided over MR element 106 using available conductor deposition and patterning techniques. Upper shield layer 103 comprising two to three microns of electroplated permalloy is formed to complete the read head structure.

Lower pole 107 is formed on an upper surface of shield 103. Desirably, lower pole 107 is formed integrally with shield 103 as described in greater detail hereinafter. In a particular example lower pole 107 comprises the same magnetic materials as shield 103, although it is possible and desirable in some instances to form pole 107 of a material having a improved magnetic properties suited to a particular application. A write gap 110 comprising a high resistivity non-magnetic material separates lower pole tip 107 from upper pole tip 109. Write gap 110 is formed by sputter deposition of approximately one to one to four thousand angstroms of non-magnetic material such as alumina. In accordance with the present invention, lower pole tip 107 and upper pole tip 109 define a write head of atypically small dimensions. In a particular example, upper pole tip 109 is in the order of 1.0 to 3.0 microns wide.

Referring to FIG. 2, a planarizing structure comprising an insulator such as alumina, silicon oxide, silicon nitride, or any available non-organic dielectric, or the like is formed to form first insulator 201 upon which coils 207 are formed. FIG. 2 shows a vertically stacked coil structure comprising a first layer of coils 207 covered by a coil insulator 203. A second layer of coils 209 are formed on an upper surface of coil insulator 203, and covered by a second coil insulator 205. Any number of vertically stacked layers of coils can be formed in this manner. Coil insulator layers 203 and 205 comprise, for example, from 0.5 to 10 microns thick of a suitable crosslinkable polymer such as photoresist. In a specific example, three to four microns of AZ4000 positive photoresist (available from Hoechst Celanese, Inc.) is used to form coil insulating layer 203 and 205. Other crosslinkable polymer materials, including negative photoresist materials, may be used. Coil insulators 203 and 205 are formed using a cure process that substantially completely crosslinks the crosslinkable polymer content and desirably drives out substantially all of the solvents.

One feature of the present invention is that the stacked coil structure shown in FIG. 2 can be formed after upper pole tip 109 and lower pole tip 107. This enables upper pole tip 109 and lower pole tip 107 to be formed on a planar surface and patterned using comparatively thin photoresist. The thin photoresist process provides greater process control and enables definition of fine geometry features in the micron and submicron range. Upper pole tip 109 is contacted by upper pole 111 that comprises 2–3 microns of a magnetic material such as permalloy applied by, for example, electroplating. Upper pole tip 109 has a vertical height selected to space the lower surface of upper pole 111 away from write gap 110 such that upper pole 111 does not create fringing fields of sufficient magnitude to write or erase data on the magnetic media (not shown).

Figure 3:
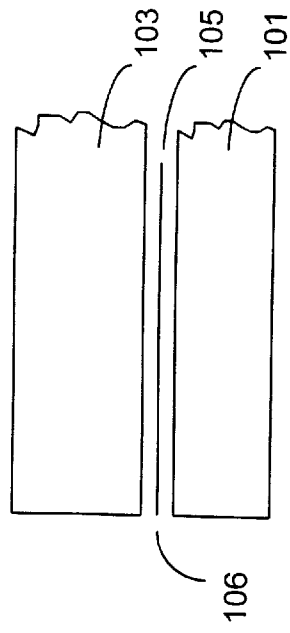
FIG. 3 and FIG. 4 show orthogonal views of the read/write head illustrated in FIG. 1 and FIG. 2 at a later stage in processing.
Figure 4:
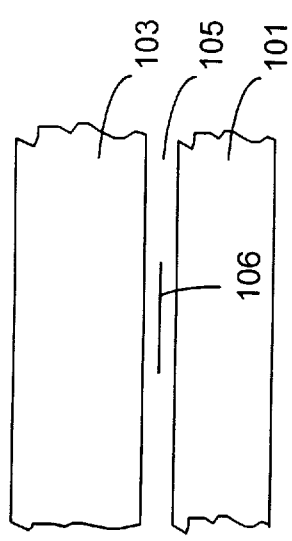

FIG. 3 illustrates a view of the present invention from the disk/media surface. FIG. 4 shows cross-sectional views illustrating a process to manufacture the write portion of the read/write head in accordance with the present invention. FIG. 3 and FIG. 4 show the structure in accordance with the present invention at a stage in which the read portion is substantially complete. In accordance with the present invention, upper shield/pole layer 103 is covered by write gap layer 110 using a blanket deposition process. Write gap layer 110 is subsequently covered by a blanket deposition of magnetic material to a thickness in the range of 1.0 to 4.0 microns and about 2.5 microns in a specific example to form upper write tip 109. The thickness of upper write tip 109 is desirably at least three times the thickness of write gap 110 so provide adequate separation of upper pole 111 (shown in FIG. 1) from write gape 110. This vertical separation separates pole 111 and particularly the high magnetic fields that form at the corner formed where upper tip 109 and upper pole 111 adjoin. Without proper vertical separation, these high magnetic fields may cause excessive fringing.

A significant advantage in accordance with the present invention is that upper write tip 109 can be formed using magnetic materials that can be applied using thin film deposition techniques. Prior processes deposited the material forming tip 109 simultaneously with upper pole 111 (shown in FIG. 1 and FIG. 2) after formation of coils 207 and 209. Because of the difficult cross section, the write tip and yoke were formed by electroplating which greatly restricted the types of materials that could be used. In accordance with the present invention, write tip 109 may be formed before the formation of coils 207 and 209 and may use thin film techniques because a nearly planar cross section exists at this stage in processing. Materials with high magnetic moment such as selected nickel-iron alloys, CZT, iron-aluminum-nickel alloys, and the like may be used to form upper write tip 109. CZT is a soft magnetic film of cobalt, zirconium, and tantalum. Upper pole 111 can be formed separately of a magnetic material of higher resistivity to enable the write element to develop a magnetic field faster. In this manner, pole 111 and upper tip 109 can each use materials specifically chosen to optimize performance of the write element.

Figure 5:
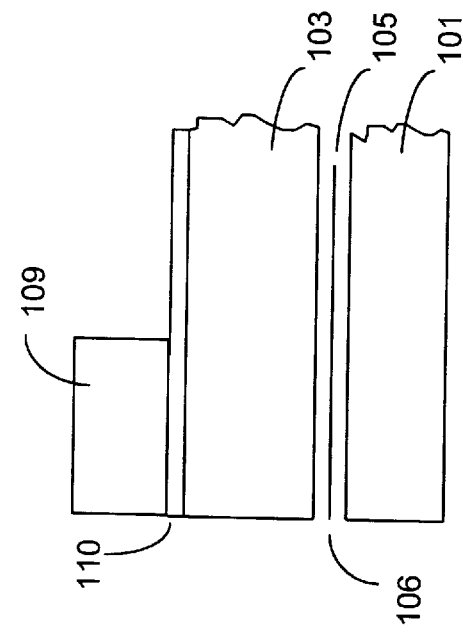
FIG. 5 and FIG. 6 show orthogonal views of the read/write head in accordance with the present invention at a later stage in processing.
Figure 6:
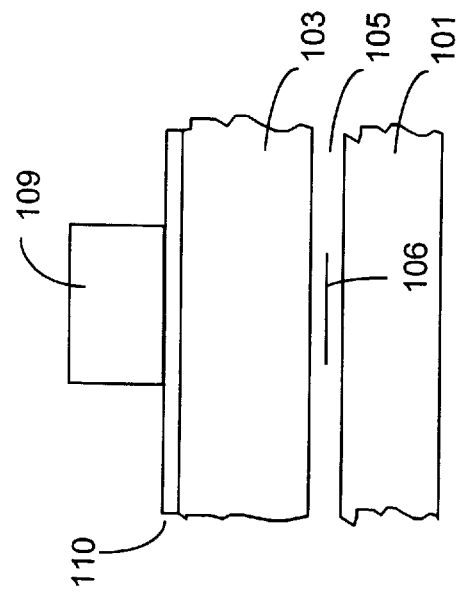

In FIG. 5 and FIG. 6, upper write tip 109 is patterned and etched using conventional photoresist techniques to align upper tip 109 with respect to with read element 106 in a conventional manner. Using the same mask or using upper tip 109 as a mask, write gap 110 is etched through and a portion of the upper surface of pole/shield 103 is etched to define lower write tip 107. As illustrated in FIG. 7 and FIG. 8, the etch of write gap 110 and lower write tip 107 is self-aligned to upper write tip 109 in the preferred implementation and does not require additional masking and alignment steps. Alternatively, pole/shield layer 103 may be formed as a multi-layer structure having an upper surface comprising a thin layer of high magnetic moment material. The etch shown in FIG. 7 and FIG. 8 is used to remove this material in all locations except lower write tip 107.

Figure 11:
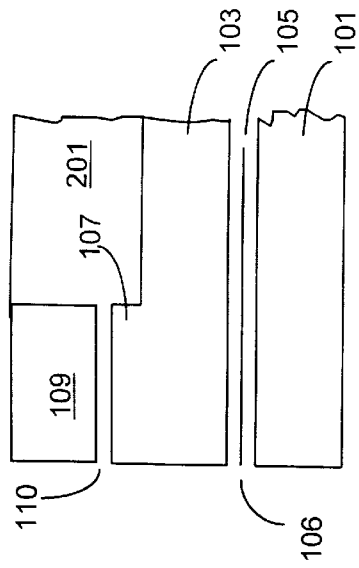
FIG. 11 and FIG. 12 show orthogonal views of the read/write head in accordance with the present invention at a later stage in processing.
Figure 12:
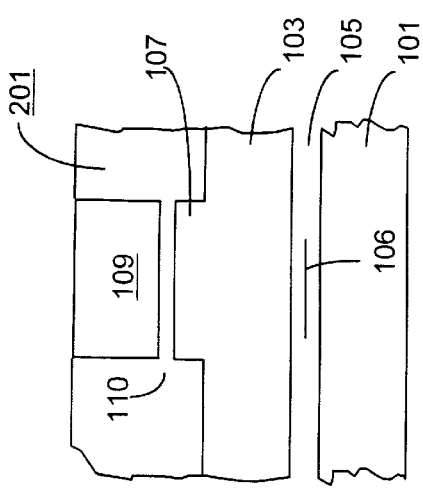

Planarizing structure 201 is formed as shown in FIG. 9 and FIG. 10 by a blanket deposition of a conformal dielectric, non-magnetic material such as alumina, silicon oxide, silicon nitride, or other available non-organic dielectric. The initial deposition must be at least as thick as the height of the write element structure as defined by the difference between the upper surface of shield 103 and the upper surface of write tip 109. Mechanical or chemical mechanical polishing is used to planarize structure 201 as shown in FIG. 11 and FIG. 12. An advantage of planarizing structure 201 is that the base of coils 207 is lower with respect to write gap 110 than prior designs making the write coil structure easier to cover with subsequent material deposition processes.

Figure 13:
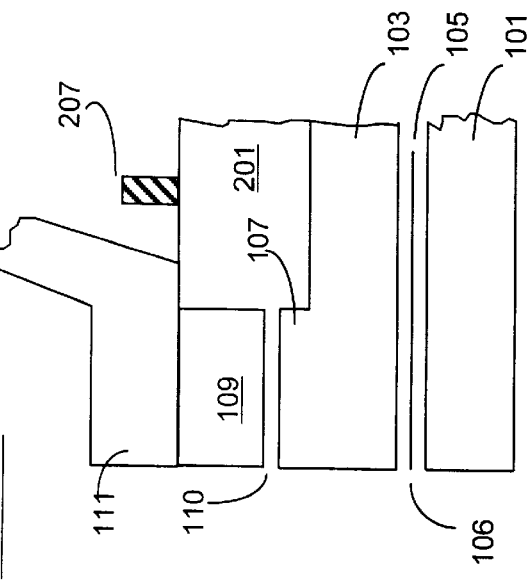
FIG. 13 and FIG. 14 show orthogonal views of the read/write head in accordance with the present invention at near-final stage in processing.
Figure 14:
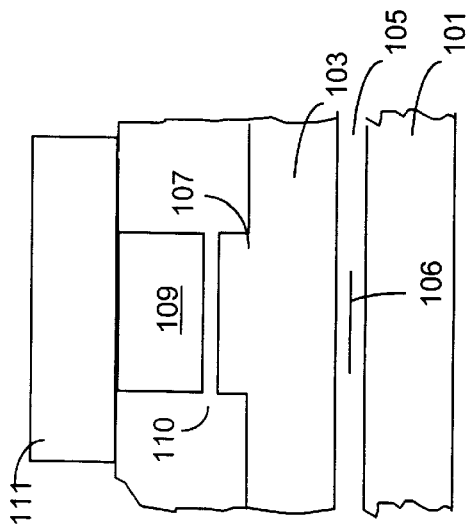

Upper pole 111 shown in FIG. 13 is formed to magnetically contact upper write tip 109 after the formation of coils 207 and 209 shown in FIG. 2 and FIG. 14. Upper pole 111 is formed by deposition of a seed layer and electroplating of a magnetic material such as permalloy to a thickness of three to four microns. Coils 207 and 209 comprise a conductive material such as copper, gold, alloys, or the like. In a specific example, coils 207 are formed by providing seed layer (not shown) of copper or chromium-copper having a thickness of about 1000 angstroms on top of planarizing structure 201. Copper, copper alloy, or a suitable equivalent is electroplated to a thickness of about four microns using a patterned photoresist frame to define coils 207. The photoresist frame is removed and excess conductive material is removed by available photolithography and etch techniques to remove any undesired conductive paths between adjacent portions of coil 207.

Coils 207 are covered by a first coil insulator 203 (shown in FIG. 2) that comprises, for example, a cured photoresist. A layer of photoresist such as AZ4000 series positive photoresist is applied by spin, spray, or other available resist application techniques to a thickness of about five microns. The thickness chosen to completely fill between adjacent portions of coils 207 and to separate the tops of coils 207 from bottoms of coils 209 (shown in FIG. 2) by a selected amount. Any number of coils 207 and 209 can be accommodated by the process in accordance with the present invention.

Referring again to FIG. 13, one advantage in accordance with the present invention is that the lower portion of upper pole 111 need not have critical dimension control as it is sufficiently removed from write gap 110 such that pole 111 will not define the track width of read/write head 100.

This allows upper pole 111 to be patterned and defined using conventional thick photoresist techniques used in the past while achieving the benefits of a small dimension write head.

Although the invention has been described and illustrated with a certain degree of particularity, it is understood that the present disclosure has been made only by way of example. For example, the present invention is described in terms of a merged read/write head for a magnetic disk drive, however, the teachings of the present invention can be applied to a magnetic tape drive or other magnetic recording media with minor modification. Numerous changes in the combination and arrangement of parts can be resorted to by those skilled in the art without departing from the spirit and scope of the invention, as hereinafter claimed.

We claim:

1. A head structure for writing data on a magnetic media comprising:

a first pole having an upper surface substantially planar and perpendicular to a pole axis;

a planar write gap covering a portion of the upper surface, wherein the write gap comprises a nonmagnetic material having a gap thickness measured along the pole axis;

an upper pole tip formed on the planar write gap having a first width measured transverse to the pole axis, wherein the upper pole tip comprises a magnetic material having a thickness measured along the pole axis at least three times the write gap thickness and selected from the range of about 1 to 4 microns;

a second pole having a second width greater than the first width and coupling to an upper surface of the upper pole tip; and a conductive coil magnetically coupled to the first pole and the second pole to induce magnetic flux within the first and second pole in response to a current flowing in the coil.

2. The head structure of claim 1 wherein the upper pole tip comprises a material having a higher magnetic moment than the second pole.

3. The head structure of claim 1 wherein the second pole comprises a material with a higher resistivity than the upper pole tip.

4. The head structure of claim 1 wherein the upper pole tip comprises a film of cobalt, zirconium, and tantalum (CZT) or another high moment magnetic alloy and the first pole comprises permalloy.

5. The head structure of claim 1 wherein the thickness of the upper pole tip is about 2.5 microns.

6. The head structure of claim 1 wherein the first width of the upper pole tip is on the order of 1 to 3 microns.

7. The head structure of claim 1 further comprising a read element including a magnetic shield formed in part by the lower pole.

8. A thin film magnetic head for writing data to and reading data from a magnetic recording media, comprising:

a first pole of magnetic material comprising having a planar upper surface and a lower pole tip extending from the planar upper surface parallel to a pole axis;

a planar layer of nonmagnetic material positioned over an upper surface of the lower pole tip defining a write gap;

an upper pole tip of magnetic material formed on the write gap layer;

a second pole of magnetic material contacting an upper surface of the upper pole tip, wherein the magnetic material of the upper pole tip has a lower resistivity than the magnetic material of the second pole to enable faster forming of a magnetic field;

an insulator layer formed on the planar upper surface of the first pole adjacent the lower pole tip, the write gap layer and the upper pole tip, wherein the insulator layer comprises an upper surface substantially coplanar with the upper surface of the upper pole tip; and a conductive coil assembly magnetically coupled to the first and second poles to induce magnetic flux within the first and second pole, the conductive coil assembly including a coil layer with a base mating with the upper surface of the insulator layer.

9. The magnetic head of claim 8, wherein the conductive coil assembly further includes a coil insulator formed on the coil layer and a second coil layer formed on the coil insulator.

10. The magnetic head of claim 8, wherein the upper pole tip has a thickness as measured along the pole axis about three times greater than a thickness of the write gap layer.

11. The magnetic head of claim 8, wherein the lower pole tip, the write gap layer, and the upper pole tip each have a width as measured transverse to the pole axis that is in the range of about 1 to about 3 microns.

12. The magnetic head of claim 8, wherein the magnetic material of the upper pole tip is selected from the group of high magnetic moment materials consisting of nickel-iron alloy, a film of cobalt, zirconium, and tantalum (CZT), and iron-aluminum-nickel alloy.

* * * * *